(12) United States Patent
Faust, Jr.

(10) Patent No.: US 11,593,879 B1
(45) Date of Patent: *Feb. 28, 2023

(54) SYSTEM AND METHOD FOR ENABLING ARBITRAGE BETWEEN MARKET PRICE AND UNDERLYING VALUE OF EXCHANGE-TRADED FUND SHARES

(71) Applicant: Eaton Vance Management, Boston, MS (US)

(72) Inventor: Thomas E. Faust, Jr., Boston, MA (US)

(73) Assignee: Eaton Vance Management, Boston, MA (US)

( * ) Notice: Subject to any disclaimer, the term of this patent is extended or adjusted under 35 U.S.C. 154(b) by 81 days.

This patent is subject to a terminal disclaimer.

(21) Appl. No.: 17/335,436

(22) Filed: Jun. 1, 2021

Related U.S. Application Data

(60) Division of application No. 16/438,117, filed on Jun. 11, 2019, now Pat. No. 11,055,779, which is a continuation-in-part of application No. 13/889,587, filed on May 8, 2013, now abandoned.

(60) Provisional application No. 62/769,394, filed on Nov. 19, 2018, provisional application No. 61/644,017, filed on May 8, 2012.

(51) Int. Cl.
*G06Q 40/04* (2012.01)

(52) U.S. Cl.
CPC .................. *G06Q 40/04* (2013.01)

(58) Field of Classification Search
CPC .................................................. G06Q 40/04
See application file for complete search history.

(56) References Cited

U.S. PATENT DOCUMENTS

| | | | |
|---|---|---|---|
| 7,813,987 B1 | 10/2010 | Kuhnle et al. | |
| 7,865,426 B2* | 1/2011 | Volpert | G06Q 40/06 705/37 |
| 2003/0233302 A1* | 12/2003 | Weber | G06Q 40/04 705/36 R |
| 2004/0186803 A1* | 9/2004 | Weber | G06Q 40/00 705/35 |
| 2006/0253376 A1* | 11/2006 | Seale | G06Q 30/0201 705/37 |

(Continued)

*Primary Examiner* — Asha Puttaiah
(74) *Attorney, Agent, or Firm* — Davis, Malm & D'Agostine, PC; Richard L. Sampson

(57) ABSTRACT

A system and method is provided for administering an actively managed fund having shares tradable on an exchange, to support efficient secondary market trading. A Fund Module defines an actively managed ETF. A Portfolio Module tracks a portfolio held by the ETF while maintaining confidentiality of at least a portion thereof. A Basket Module publishes Creation and Redemption Baskets including a subset of the fund portfolio. A Current Valuation Module calculates a current Intraday NAV for the portfolio and Baskets throughout a trading day. A Swap Module provides for periodic entry and exit from NAV Swaps between an ETF Party and Swap Counterparties, who exchange payments based on performance of the fund portfolio and the Fund Basket. A Creation/Redemption Module permits creations and redemptions of ETF shares in exchange for the Fund Basket. Arbitrage is permitted between ETF share price and Intraday NAV without full portfolio disclosure.

32 Claims, 8 Drawing Sheets

(56) References Cited

U.S. PATENT DOCUMENTS

2009/0063366 A1\* 3/2009 Friedman ............... G06Q 40/10
                                                      705/37
2013/0006890 A1\* 1/2013 Faust, Jr. ............... G06Q 40/06
                                                      705/36 R \* cited by examiner

SYSTEM AND METHOD FOR ENABLING ARBITRAGE BETWEEN MARKET PRICE AND UNDERLYING VALUE OF EXCHANGE-TRADED FUND SHARES

RELATED APPLICATION

This application is a Divisional of U.S. patent application Ser. No. 16/438,117, entitled System and Method for Enabling Arbitrage between Market Price and Underlying Value of Exchange-Traded Fund Shares, filed on Jun. 11, 2019, which claims priority to U.S. Provisional Patent Application Ser. No. 62/769,394, entitled System and Method for Enabling Arbitrage between Market Price and Underlying Value of Exchange-Traded Fund Shares, filed on Nov. 19, 2018 and is a Continuation-In-Part of U.S. patent application Ser. No. 13/889,587, entitled System and Method for Enabling Arbitrage between Market Price and Underlying Value of Exchange-Traded Fund Shares in the Absence of Full Portfolio Disclosure Using Intraday Creations and Redemptions and/or Special Dealer Shares, filed on May 8, 2013, which claims the benefit of U.S. Provisional Patent Application Ser. No. 61/644,017, entitled Method for Effecting Arbitrage Between Market Price and Underlying Value of Exchange-Traded Fund Shares in the Absence of Full Portfolio Disclosure Using Intraday Creations and Redemptions and/or Special Dealer Shares, filed on May 8, 2012, the contents all of which are incorporated herein by reference in their entireties for all purposes. This application is also related to U.S. Pat. No. 10,102,573, entitled System and Method for Enabling Arbitrage between Market Price and Underlying Value of Exchange-Traded Fund Shares in the Absence of Full Portfolio Disclosure Using Intraday Net Asset Value Swaps, filed on May 8, 2013 and issued on Oct. 16, 2018, which claims the benefit of U.S. Provisional Patent Applications: Ser. No. 61/643,999, entitled Method for Effecting Arbitrage Between Market Price and Underlying Value of Exchange-Traded Fund Shares in the Absence of Full Portfolio Disclosure Using Intraday Net Asset Value Swaps, filed on May 8, 2012; and Ser. No. 61/647,583, entitled Method for Effecting Arbitrage Between Market Price and Underlying Value of Exchange-Traded Fund Shares in the Absence of Full Portfolio Disclosure Using Intraday Net Asset Value Swaps, filed on May 16, 2012, the contents all of which are incorporated herein by reference in their entireties for all purposes.

BACKGROUND

Technical Field

This invention relates to asset management and administration, and more particularly to an automated system and method for enabling arbitrage between the market trading prices of an ETF and its underlying real-time portfolio values in the absence of full current portfolio disclosure.

Background Information

Throughout this application, various publications, patents and published patent applications are referred to by an identifying citation. The disclosures of the publications, patents and published patent applications referenced in this application are hereby incorporated by reference into the present disclosure.

Exchange-traded funds ("ETFs") are one of the most significant financial market innovations of the past quarter century. ETFs give retail and institutional investors the ability to buy and sell share interests in portfolios of equities, fixed income securities and other investments through market transactions in which trading prices of ETF shares are linked to the current value of the underlying portfolio investments through an arbitrage mechanism. In the United States, ETFs are registered open-end investment companies or unit investment trusts that operate in reliance on a series of exemptions granted by the U.S. Securities and Exchange Commission ("SEC"), beginning in 1993, to certain provisions of the Investment Company Act of 1940, as amended ("Investment Company Act"). Unaffiliated third-party investors normally buy and sell ETF shares through broker-dealers in secondary market transactions on an exchange. Share transactions directly with the ETF itself are restricted to broker-dealers designated as "Authorized Participants" who may purchase and redeem "Creation Unit" aggregation of shares in transactions priced as of the time the net asset value ("NAV") of the ETF is next determined (generally 4:00 pm eastern time each business day). Most ETFs effect direct purchases and redemptions primarily through "in kind" delivery of portfolio securities, rather than in cash. Market makers and other arbitrageurs who buy and sell ETF shares on the open market may seek to earn arbitrage profits by entering into offsetting positions in the underlying securities, and using purchases and redemptions of ETF shares in Creation Unit quantities through Authorized Participants to manage their inventories of ETF shares and underlying portfolio securities.

Compared to conventional mutual funds, ETFs have a number of distinguishing features that may benefit investors: (1) ETF shares can be bought and sold on the secondary market throughout each trading day at current market-determined prices, whereas mutual fund shares typically can be bought and sold only once each day, in transactions directly with the issuing fund at prices based on the fund's daily closing NAV; (2) ETFs are typically less expensive to own (i.e., have lower total expense ratios) than comparably invested mutual funds, primarily due to lower embedded shareholder administration and distribution costs; (3) ETFs typically incur lower trading costs than comparably invested mutual funds, based on ETFs' customary use of in-kind transfers of portfolio securities in connection with purchases and redemptions of shares (in Creation Unit quantities by or through Authorized Participants) rather than transacting with purchasing and redeeming shareholders in cash, the general practice among mutual funds; and (4) ETFs may achieve higher levels of tax efficiency than comparably invested mutual funds by using in-kind distributions of appreciated portfolio securities to redeeming shareholders to remove the securities from their portfolios without the ETF realizing capital gains.

A well-recognized adverse tax effect of investing in mutual funds is that a fund's sales of appreciated securities to raise cash to meet redemptions can trigger capital gains realizations for the fund's other shareholders. Funds (including ETFs) that utilize in-kind distributions of securities to meet redemptions can largely avoid such events. Section 852(b)(6) of the Internal Revenue Code provides that a fund's distributions of appreciated property to meet shareholder redemption requests do not result in recognition by the fund of capital gains on the distributed property. The fact that ETF creations and redemptions take place only in Creation Unit aggregations of shares effected through designated Authorized Participants gives ETFs a practical ability to utilize in-kind redemptions (and achieve the associated tax benefits) that broadly held mutual funds generally do not have.

As mentioned above, the linkage between the market trading price and current NAV of an ETF is based on an arbitrage mechanism, and derives from the ability of ETF market makers and other arbitrageurs to earn arbitrage profits by entering into transactions in an ETF's underlying portfolio securities or other market instruments to offset the long or short market exposures they take on when they buy or sell ETF shares in the secondary market and/or create or redeem Creation Units of ETF shares through an Authorized Participant. Generally speaking, the simpler and more reliable the arbitrage profit opportunity available to an ETF's arbitrageurs, the tighter will be the ETF's bid-ask spread in secondary market trading and the narrower the premium or discount of market trading prices to underlying portfolio value.

For ETFs that engage in active investment strategies, there is a potential conflict between the portfolio disclosures required to facilitate the arbitrage that supports efficient secondary market trading and the desire to maintain the confidentiality of the ETF's current portfolio trading information.

For this reason, active managers have to date largely avoided introducing their strategies as transparent ETFs because the required daily holdings disclosures can facilitate front-running of portfolio trades and enable copycat investors to replicate a fund's portfolio positioning.

There is therefore a need for a system and method for enabling arbitrage between the market trading prices of an ETF and its underlying real-time portfolio values in the absence of full current portfolio disclosure.

SUMMARY

In one aspect of the invention, a system is provided for administering an actively managed fund having shares tradable on an exchange, to support efficient secondary market trading. The system includes a Fund Module configured to define an actively managed exchange traded fund (ETF) having a plurality of ETF shares available for sale, the plurality of ETF shares being tradable on one or more secondary markets. A Portfolio Module tracks a fund portfolio of assets held by the fund while maintaining confidentiality of at least a portion of the fund portfolio. A Basket Module identifies and publishes a Fund Basket in the form of Creation and Redemption Baskets including a subset of the assets held by the fund. A Current Valuation Module calculates a current intraday net asset value (Intraday NAV) of the assets held by the ETF and of the Fund Basket, the Intraday NAV being calculated periodically throughout a trading day. A Swap Module establishes terms, and provides for the periodic entry into and exit from, NAV Swaps between an ETF Party and Swap Counterparties, who exchange payments based on performance of the fund portfolio and the Fund Basket. A Creation/Redemption Module permits creations and redemptions of ETF shares in exchange for the Fund Basket. The system enables a qualified party to effect arbitrage between a current market price of said fund shares and the Intraday NAV in absence of full disclosure of said fund portfolio, to support efficient secondary market trading.

In another aspect of the invention, a method is provided for enabling arbitrage between the market price and the underlying value of Exchange-Traded Fund (ETF) shares in the absence of full portfolio disclosure, to support efficient secondary market trading. The method includes defining, with a Fund Module, an actively managed ETF having ETF shares available for sale, and which are tradable on a secondary market. The method includes tracking, with a Portfolio Module, a portfolio of assets held by the fund while maintaining confidentiality of at least a portion of the fund portfolio. A Fund Basket, including Creation and Redemption Baskets, is identified and published, with a Basket Module, the Fund Basket including a subset of the assets held by the fund. An Intraday NAV of the fund assets is calculated, with a Current Valuation Module. The Intraday NAV is calculated periodically throughout a trading day. A Swap Module establishes terms of, and provides for the periodic entry into and exit from, NAV Swaps between an ETF Party and Swap Counterparties, wherein the ETF Party and Swap Counterparties exchange payments based on performance of the fund portfolio and the Fund Basket. A qualified party selectively creates and redeems ETF shares, using a Creation/Redemption Module, wherein the qualified party is permitted to effect arbitrage between a current market price of said ETF shares and the Intraday NAV in absence of full disclosure of said fund portfolio, to support efficient secondary market trading.

In yet another aspect of the invention, a method is provided for effecting arbitrage between market price and underlying value of Exchange-Traded Fund (ETF) shares in the absence of full portfolio disclosure, to support efficient secondary market trading of the ETF shares. This method includes communicably coupling a qualified party computer to the aforementioned system, capturing, with the qualified party computer, the current Intraday NAV published by the Current Valuation Module, the contents of the Fund Basket published by the Basket Module, and the current market price of the ETF shares on a secondary market. In the event the current market price exceeds the Intraday NAV, the method includes borrowing ETF shares from a Securities Lender in exchange for posting collateral, selling the borrowed ETF shares on a secondary market, purchasing shares of the Fund Basket in a quantity corresponding to the borrowed ETF shares, and entering into an NAV Swap with the ETF Party, using the Swap Module, wherein the NAV Swap has a notional value corresponding to a value of the borrowed ETF shares, and the ETF Party and qualified party exchange payments based on performance of the fund portfolio and the Fund Basket. Aspects of this method may be repeated until a Creation Unit of ETF Shares have been borrowed, wherein ETF shares are then created in exchange for a corresponding quantity of the Fund Basket assets which are purchased using proceeds from the aforementioned sale of the borrowed ETF shares. The created ETF shares are then used to replace the borrowed shares, wherein the posted collateral is returned.

In still another aspect of the invention, a method is provided for effecting arbitrage between market price and underlying value of Exchange-Traded Fund (ETF) shares in the absence of full portfolio disclosure, to support efficient secondary market trading of the ETF shares. This method includes communicably coupling a qualified party computer to the aforementioned system and capturing the current Intraday NAV published by the Current Valuation Module, the Fund Basket published by the Basket Module, and the current market price of the ETF shares on a secondary market. In the event the Intraday NAV exceeds the current market price, the method includes purchasing ETF shares on a secondary market, borrowing shares of the Fund Basket in a quantity corresponding to the purchased ETF shares, and selling the borrowed shares on a secondary market. The qualified party may then enter into an NAV Swap with the ETF Party, using the Swap Module, at a notional value corresponding to a value of the purchased ETF shares, in which the ETF Party and qualified party exchange payments based on performance of the fund portfolio and the Fund Basket. Aspects of this method may be repeated until a Redemption Unit of ETF Shares has been purchased, followed by transacting with the Creation/Redemption Module to redeem the purchased ETF shares in exchange for a corresponding quantity of the Fund Basket assets which are used to replace the borrowed Fund Basket assets.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1A:
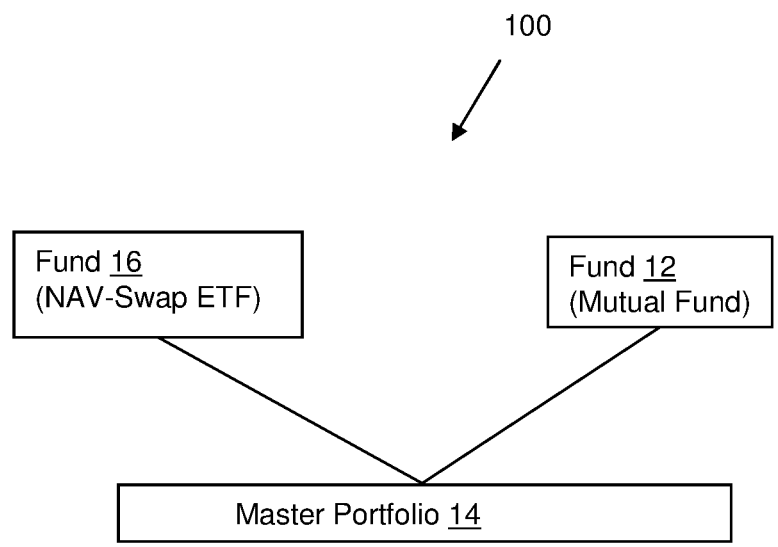
FIG. 1A is a block diagram of an embodiment of a master-feeder system of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

General Overview

Aspects of the present invention address the aforementioned conflict by enabling arbitrage between the market trading prices of an ETF and its underlying real-time portfolio values in the absence of full current portfolio disclosure. Particular embodiments of the invention include mechanisms for:

disclosing an ETF's full portfolio holdings of securities, other market instruments and cash ("ETF Portfolio") at a frequency and time lag sufficient to preserve the confidentiality of its current portfolio trading information.

disclosing the composition of the basket of securities and cash to be used to effect creations and redemptions of Creation Units of ETF shares ("Basket Portfolios") on a particular day prior to the opening of market trading on that day.

disclosing the fees that apply to creations and redemptions of Creation Units of ETF shares on a particular day prior to the opening of market trading on that day.

publicly disseminating an ETF's indicative intraday values ("IIVs") only at such frequency and with such specificity as to avoid indirect disclosure of portfolio holdings information that the ETF seeks to remain confidential.

periodically calculating, throughout periods of an ETF's market trading, real-time current NAVs of (a) the ETF Portfolio, (b) its creation and redemption Basket Portfolios and (c) any Beta Patch Portfolios as currently specified by the ETF. Alternatively, or in addition, continuously calculate the real-time current NAVs of portfolios (the "Variance Portfolios") representing the variance between the current ETF Portfolio on the one hand and the Basket Portfolios and any attached Beta Patch Portfolios (together, the "Modified Basket Portfolios") on the other hand.

establishing swaps ("NAV Swaps") between an ETF (or an affiliate or other designee thereof) (collectively, the "ETF Party") and arbitrageurs in its shares (e.g., broker-dealers serving as market makers), the terms of swap transactions being: (a) the ETF Party pays or receives the return of the ETF Portfolio and the counterparty pays or receives the return of the ETF's currently specified creation or redemption Basket Portfolio (or alternatively, the Modified Basket Portfolio) or (b) the ETF Party pays to or receives from the counterparty the return of a specified Variance Portfolio.

enabling ETF market makers and other eligible arbitrageurs to expeditiously enter into long and short positions in NAV Swaps with the ETF Party as counterparty in real-time throughout periods of ETF market trading.

These aspects may be implemented in connection with a stand-alone fund or alternatively, with a master-feeder (also variously referred to as a fund-of-fund) arrangement with one or more master funds (master portfolios) having both mutual fund and ETF feeder funds, as will be discussed in greater detail hereinbelow.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

Where used in this disclosure, the term "mutual fund" refers to open-end investment companies registered under the Investment Company Act of 1940, as amended (Investment Company Act). Mutual funds permit their shareholders to redeem their share interests each business day at a price based on the fund's next-determined net asset value.

The term "ETF" and/or "exchange-traded fund" refers to registered open-end investment companies or unit investment trusts that operate in reliance on a series of exemptions granted by the U.S. Securities and Exchange Commission (SEC) beginning in 1993 to certain provisions of the Investment Company Act. Retail and most institutional investors normally buy and sell ETF shares through secondary market transactions on an exchange. Transactions with the ETF itself (i.e., primary market transactions) are restricted to broker-dealers designated as "Authorized Participants" who purchase and redeem "Creation Unit" aggregation of shares from the ETF at net asset value. Market trading prices of ETF shares are linked to current net asset values by an arbitrage mechanism. Market makers and other arbitrageurs who buy and sell fund shares on the open market may earn arbitrage profits by entering into offsetting hedge positions in the underlying securities and other instruments, and using creations and redemptions of ETF shares in Creation Unit quantities through Authorized Participants to manage their ETF and hedge inventory.

The term "computer" is meant to encompass a workstation, personal computer, personal digital assistant (PDA), wireless telephone, or any other suitable computing device including a processor, a non-transitory computer readable medium upon which computer readable program code (including instructions and/or data) may be disposed, and a user interface. The term "server" is intended to refer to a computer-related component, including hardware, software, and/or software in execution. For example, a server may include, but is not limited to being, a process running on a processor, a processor including an object, an executable, a thread of execution, a program, and a computer. Moreover, the various components may be localized on one computer and/or distributed between two or more computers. The term "real-time" refers to sensing and responding to external events nearly simultaneously (e.g., within milliseconds or microseconds) with their occurrence, or without intentional delay, given the processing limitations of the system and the time required to accurately respond to the inputs.

Systems and methods embodying the present invention may be programmed in any suitable language and technology, such as, but not limited to: C++; Visual Basic; Java; VBScript; Jscript; BCMAscript; DHTM1; XML and CGI. Alternative versions may be developed using other programming languages including, Hypertext Markup Language (HTML), Active ServerPages (ASP) and Javascript. Any suitable database technology may be employed, such as, but not limited to, Microsoft SQL Server or IBM AS 400+.

As mentioned above, aspects of the present invention include a system and method for effecting arbitrage between the market trading prices of an ETF and its underlying real-time portfolio values in the absence of full current portfolio disclosure. Embodiments of the invention include mechanisms configured to implement the following:

Disclose an ETF's full portfolio holdings of securities, other market instruments and cash ("ETF Portfolio") at a frequency and time lag sufficient to preserve the confidentiality of its current portfolio trading information.

In the U.S., funds registered under the Investment Company Act are required to provide public disclosure of their full portfolio holdings at least once each quarter, with a time lag of not more than 60 days. Since 2008, the SEC has approved exemptive applications for a number of new ETFs following active (i.e., non-index) investment strategies with the stipulation that the funds must disclose on a public website their full portfolio holdings as of the end of each business day prior to the start of market trading on the next business day. Although a handful of fully transparent active ETFs that follow fixed income strategies have been commercially successful, no fully transparent active ETF that invests in equity securities has to date achieved significant commercial success. A common practice among actively managed mutual funds is to disclose portfolio holdings as of each month end, with a 30-day lag. In aspects of the present invention, an ETF would provide portfolio disclosure at least sufficient to meet the Investment Company Act requirements and may provide disclosures more frequently and with such shorter time lag as determined by the ETF's investment advisor to be consistent with shareholder protection. Under most circumstances, the primary disclosure concern should be to maintain the confidentiality of fund trading information, as opposed to fund holdings information. Once a fund's trading program (whether buying or selling) in a particular security is completed, disclosing the fund's ownership position in that security should generally present little or no risk to the fund.

Disclose the composition of the basket of securities and cash to be used to effect creations and redemptions of Creation Units of ETF shares ("Basket Portfolios") on a particular day prior to the opening of market trading on that day.

An ETF's creation and redemption Basket Portfolios will generally vary from the current ETF Portfolio as the ETF's advisor deems appropriate to maintain the confidentiality of current portfolio trading information. Securities being purchased for the ETF Portfolio will, for example, generally not be included in Basket Portfolios until purchases are completed. Securities being sold from the ETF Portfolio may not be removed from the Basket Portfolios until sales are substantially completed. Basket Portfolios may include positions in cash in excess of the ETF's actual cash positions to preserve the confidentiality of pending transactions and to substitute for holdings for which in-kind delivery is not practicable or deemed not to be in the best interest of shareholders. Some embodiments of the present invention may use different Basket Portfolios for creations and redemptions; other embodiments may use the same Basket Portfolio for both creations and redemptions. In particular embodiments, the Basket Portfolios may include securities positions that are not currently in the ETF Portfolio or may consist entirely of cash. Certain embodiments may permit a creating or redeeming shareholder to substitute cash, other securities and/or other market instruments for all or a portion of the Basket Portfolio positions on such terms and conditions as set forth by the ETF or its advisor.

An ETF may elect to disclose the Basket Portfolios for a particular day prior to the close of market trading on the preceding business day.

In particular embodiments, an ETF may, in conjunction with its Basket Portfolio disclosures, identify and disclose one or more executable market instruments or combinations of market instruments ("Beta Patch Portfolios", which may include index ETFs or index futures contracts) representing the incremental aggregate market exposure of the ETF's current or desired portfolio composition versus the creation and redemption Basket Portfolios. Embodiments using different creation and redemption Basket Portfolios may have separate Beta Patch Portfolios for each.

Disclose the fees that apply to creations and redemptions of Creation Units of ETF shares on a particular day prior to the opening of market trading on that day.

The fees imposed by an ETF in connection with creations and redemptions of Creation Units of shares will generally increase or decrease with changes in the estimated cost to the ETF of trading to conform the Basket Portfolios to the ETF's desired portfolio composition. The lower the correspondence between the Basket Portfolio holdings and the ETF's desired holdings and the higher the estimated conversion trading costs, generally the higher will be the associated creation and redemption fees that are assessed. Some embodiments of the present invention may apply the same fee schedule to both creation and redemptions; other embodiments may use different fee schedules for creations and redemptions. Fees for creating or redeeming multiple Creation Units on a given day may differ from fees in connection with creating or redeeming a single Creation Unit, and the assessed fees per Creation Unit created or redeemed may also vary with the number of Creation Units created or redeemed.

ETFs that permit the substitution of cash, other securities and/or other market instruments for all or a portion of their Basket Portfolio positions may specify the amount of any additional fees that apply to such substitutions as part of the daily creation and redemption fee schedule. Alternatively, such information may be communicated directly to the creating or redeeming shareholder to whom it applies.

Publicly disseminate an ETF's indicative intraday values ("IIVs") only at such frequency and with such specificity as to avoid indirect disclosure of portfolio holdings information that the ETF seeks to remain confidential.

Current SEC policy generally requires an ETF to provide for the public dissemination of its IIVs throughout all periods of the ETF's market trading at approximately regular intervals averaging not more than 15 seconds. An exception is that ETFs whose securities holdings trade outside normal U.S. market hours are generally required to provide for dissemination of public IIVs throughout all periods of ETF market trading at approximately regular intervals averaging not more than 60 seconds. IIVs (sometimes referred to as "Underlying Trading Values," "Indicative Optimized Portfolio Values (IOPVs)," or "Intraday Values") are designed to give investors a close sense of the relationship between an ETF's current market trading price and the value of its underlying holdings.

Those skilled in the art will recognize that Index ETFs are permitted to base their publicly disseminated IIVs on the current composition of their creation and/or redemption Basket Portfolios, which, if not an exact replication, are generally a close proxy for the ETF's current holdings. The SEC requires actively managed ETFs to base publicly disseminated IIVs on their actual portfolio holdings of the close of trading on the previous business day. Using holdings as of the market close on the previous business day to determine IIVs is consistent with the mutual fund and ETF industry convention for how end-of-day NAVs are calculated. Under this convention, an ETF's market transactions of a given day do not change the securities used in determining its IIVs (and its end-of-day NAV) until the following business day. Publicly disseminated IIVs are generally calculated based on the most recent market trading prices of the constituent securities as of the time of dissemination, but may reflect bid-offer midpoints or other measures of current value at such time.

Publicly disseminated IIVs are required to be expressed at least to the nearest one cent ($0.01) per ETF share. In practice, many ETFs currently provide regular IIV disclosures expressed to the nearest one hundredth of a cent ($0.0001) per ETF share.

In particular aspects of the present invention, an ETF would provide for public dissemination of its IIVs at least sufficient to meet SEC requirements and the general informational needs of investors, but would exercise care to avoid indirect disclosures of portfolio holdings information that the ETF seeks to remain confidential. (The skilled artisan will recognize that the current holdings of an investment portfolio can be deconstructed using established computational techniques if the intraday values of the portfolio and its opportunity set of potential investments are known with sufficient precision and a sufficient number of intraday valuation data points are available. Generally speaking, the narrower the range of a portfolio's potential investments, the fewer valuation data points needed to deconstruct its current holdings.) Various embodiments of the present invention may use one or more of the following approaches to avoid the inadvertent disclosure of confidential portfolio information through the public dissemination of IIVs: (a) limiting the frequency of public IIV disclosures to not more than every 15 seconds; (b) limiting the precision of public IIV disclosures to not more than the nearest one cent ($0.01) per ETF share; and (c) establishing and maintaining ETF share prices at comparatively low levels (e.g., $10-20 per share versus $50-100 per share).

Throughout all periods of an ETF's market trading, continuously calculate the real-time current NAVs of (a) the ETF Portfolio, (b) its creation and redemption Basket Portfolios and (c) any Beta Patch Portfolios as currently specified by the ETF. Alternatively, or in addition, the system may continuously calculate the real-time current NAVs of portfolios (the "Variance Portfolios") representing the variance between the current ETF Portfolio on the one hand and the Basket Portfolios and any attached Beta Patch Portfolios (together, the "Modified Basket Portfolios") on the other hand.

An ETF's intraday NAVs would be determined in a manner consistent with the general practice among ETFs and mutual funds: that is, by dividing the total assets of the ETF, less liabilities, by the number of ETF shares currently outstanding. Consistent with conventional industry practice, an ETF's holdings for NAV-calculation purposes would be those positions held as of the close of market trading on the previous business day. Each "Reference Portfolio" position (the term "Reference Portfolio" includes the ETF Portfolio, Basket Portfolio, Beta Patch Portfolio, Modified Basket Portfolio and Variance Portfolio) would be valued in accordance with an ETF's otherwise conventional valuation procedures as disclosed in its current prospectus. In this regard, valuations of constituent securities may be based on most recent market trading prices, current bid-offer midpoints or other measures of current value.

An ETF's intraday NAVs may be calculated more frequently (e.g., once each second) and with more precision (e.g., to four decimal places per ETF share) than its publicly disseminated IIVs. To avoid indirect disclosure of confidential ETF portfolio information, intraday valuation information other than IIVs may not be disseminated (except possibly with a sufficient time lag) to the general public.

Establish swap agreements ("NAV Swaps") between an ETF (or an affiliate or other designee thereof) (collectively, the "ETF Party") and arbitrageurs in its shares (e.g., broker-dealers serving as market makers) setting forth the terms of swap transactions whereby: (a) the ETF Party pays or receives the return of the ETF Portfolio and the counterparty pays or receives the return of the ETF's currently specified creation or redemption Basket Portfolio (or alternatively, the Modified Basket Portfolio) or (b) the ETF Party pays to or receives from the counterparty the return of a specified Variance Portfolio.

Embodiments of the present invention may provide for the returns of a Reference Portfolio in an NAV Swap to be adjusted upward or downward by a predetermined amount to reflect, for example, the ETF Party's projection of the relative performance of the ETF Portfolio versus a Basket Portfolio or Modified Basket Portfolio (the "Alpha Patch Adjustment"), which adjustments may be reset daily. As an example of an Alpha Patch Adjustment, assume that an ETF Party believes that the fund's portfolio will achieve returns that exceed those of its currently specified Modified Basket Portfolio (assume here the same for both creations and redemptions) by 0.01% (one basis point) per business day, equivalent to approximately 2.50% (250 basis points) per year. Assume further that an arbitrageur that is selling ETF shares in the secondary market enters into a NAV Swap with the ETF Party providing for the arbitrageur to pay to the ETF Party the return of the Modified Basket Portfolio and receive from the ETF Party the return of the ETF Portfolio, based on a notional value equal to 10% of the value of the ETF's outstanding shares. If the ETF Party's forecast of relative returns is correct, the NAV Swap will reduce the ETF's returns by 0.001% (one-tenth basis point) per day that the swap is outstanding unless a compensating Alpha Patch Adjustment is incorporated into the terms of the NAV Swap. Adding an Alpha Patch Adjustment to the terms of the NAV Swap would increase the arbitrageur's costs to hedge its short position in ETF shares by a known amount, which it would normally seek to recoup by slightly increasing the market prices at which it sells ETF shares in the secondary market.

Embodiments of the present invention may also provide that the Reference Portfolios and Alpha Patch Adjustments for NAV Swaps that extend over multiple days will automatically update each business day to their current composition and values.

Embodiments of the present invention that provide for an affiliate of the ETF (such as its investment advisor, administrator, custodian or a broker-dealer subsidiary of any of the foregoing) or other designated third party to serve as the ETF Party in NAV Swap transactions will generally require the ETF Party to exercise reasonable care to avoid disclosure of confidential fund information and to utilize such information in a manner consistent with its obligations as a fiduciary of the fund.

Enable ETF market makers and other eligible arbitrageurs to expeditiously enter into long and short positions in NAV Swaps with the ETF Party as counterparty in real-time throughout periods of ETF market trading.

In embodiments of the present invention, eligible arbitrageurs could (subject to potential limits on position size and collateral requirements that may apply) enter into, add to, reduce or eliminate NAV Swap positions with the ETF Party at any time when the ETF is open for market trading.

By adjusting their NAV Swap positions at the same time as they shrink or grow their net long and short positions in ETF shares (through market purchases and sales of ETF shares and/or creations and redemptions of Creation Unit quantities of shares), arbitrageurs could readily convert their long or short exposures to (less than fully transparent) ETF Portfolio market risk into substantially equivalent long or short exposures to (fully transparent) Basket Portfolio or Modified Basket Portfolio positions. As a result, an ETF arbitrageur who uses NAV Swaps to offset its transactions in ETF shares would have substantially the same ability to hedge its market risk and earn arbitrage profits as if the ETF Portfolio itself were fully transparent.

Moreover, embodiments of the present invention may enable ETF market makers and other arbitrageurs to adjust their hedge positions corresponding to day-to-day changes in the ETF's Basket Portfolios and Modified Basket Portfolios. In this regard, particular embodiments provide automatic daily updates of Reference Portfolios and Alpha Patch Adjustments used in NAV Swaps, and disclosure of next-day Basket Portfolios and/or Modified Basket Portfolios prior to the market close on each trading day. These aspects may enable ETF arbitrageurs to maintain hedged positions in ETF shares over multiple trading days by entering into market transactions at or near the market close each day.

As mentioned above, embodiments of the present invention incorporate NAV Swaps entered into between one or more arbitrageurs in an ETF's shares and a specified ETF Party. The ETF Party may be the ETF itself or, alternatively, an affiliate of the ETF (such as its investment advisor, administrator, custodian or a broker-dealer subsidiary of any of the foregoing) or other designated third party.

In embodiments in which the ETF Party is not the ETF itself, the ETF Party may purchase and sell securities and other market instruments to hedge the risk exposures it assumes in connection with its NAV Swap positions. In respect of its NAV Swap hedging and other activities, the ETF Party will generally be required to exercise reasonable care to avoid disclosure of confidential fund information and to utilize such information in a manner consistent with obligations as a fiduciary of the fund.

In a simplified example that applies an embodiment of the present invention, an ETF market maker or other arbitrageur ("Market Maker"): (1) sells in the secondary market shares of an ETF that it has borrowed; (2) enters into a NAV Swap with the ETF Party with a notional value equivalent to the value of the ETF shares sold short, paying the return of the ETF's current Modified Basket Portfolio for creations (as adjusted for the Alpha Patch Adjustment that applies) and receiving the return of the ETF Portfolio; and (3) purchases an equivalent quantity of the securities constituting the ETF's Modified Basket Portfolio or a market proxy for such securities. Thereafter, each time the Market Maker materially changes its ETF share inventory position by buying or selling shares of the ETF in the secondary market, it correspondingly adjusts both the size of its NAV Swap position with the ETF Party and its holdings of the Modified Basket Portfolio securities (or market proxy). When the Market Maker's short position in the ETF grows to equal a Creation Unit of shares, the Market Maker closes its position by transacting with the ETF (through an Authorized Participant) to purchase a Creation Unit of ETF shares, which it delivers to close its borrow position and settles by delivering to the ETF the securities and cash that constitute the current Basket Portfolio and paying the creation fee that then applies. At the same time, the Market Maker terminates its position in the NAV Swap and sells the Beta Patch Portfolio positions (the difference between the Modified Basket Portfolio and the Basket Portfolio) on the secondary market.

Just as in conventional ETF market making, the Market Maker earns arbitrage profits from this set of transactions to the extent that it sells ETF shares at an aggregate premium to their then-current values and/or purchases creation Basket Portfolio securities at an aggregate discount to their current market values that, in total, exceed the creation fee that applies plus the cost to the Market Maker of establishing and maintaining its hedge position. A substantive difference versus conventional ETF market making is that the Market Maker's ability to enter into and adjust in real time its NAV Swap position allows it to continuously hedge its ETF share inventory without knowing the identity of the current ETF Portfolio.

Embodiments of the present invention may include ETFs that operate on a standalone basis, holding securities positions directly, or alternatively, ETFs that employ a master-feeder arrangement to invest in another entity ("Master Portfolio") that holds securities. Efficiencies in the management and administration of two or more funds of the same sponsor that follow similar investment programs can be achieved by the funds investing in a common underlying Master Portfolio. The daily disclosure requirements that apply to today's fully transparent actively managed ETFs make it impracticable for such ETFs to co-invest alongside (including through a master-feeder structure) similarly managed mutual funds that are engaged in strategies for which daily holdings disclosure is not appropriate. By contrast, actively managed ETFs that utilize the present invention may invest alongside (including through a master-feeder structure) similarly managed mutual funds of the same sponsor without compromising the confidentiality of the funds' current trading information.

Therefore, in a representative embodiment, a system for effecting arbitrage between market trading prices and underlying values of ETF shares in the absence of full portfolio disclosure using intraday NAV Swaps includes:

a module configured to determine and disclose daily creation and redemption Basket Portfolios that differ from current ETF Portfolio holdings as deemed appropriate by the ETF's advisor to maintain the confidentially of current trading activity and to exclude portfolios holdings for which in-kind delivery is not practicable or deemed not to be in the best interest of fund shareholders;

a module configured to determine and disclose daily creation and redemption fees that generally will increase or decrease with changes in the estimated cost to the ETF of trading to conform the transferred Basket Portfolios to the ETF's desired portfolio composition;

optionally, a module configured to determine and disclose Beta Patch Portfolios representing the incremental aggregate market exposure of the ETF's current or desired portfolio composition versus the creation and redemption Basket Portfolios, Modified Basket Portfolios that combine creation and redemption Basket Portfolios and the associated Beta Patch Portfolios, and Variance Portfolios that represent the difference between the ETF Portfolio and the creation and redemption Basket Portfolios or Modified Basket Portfolios;

optionally, a module configured to determine and integrate Alpha Patch Adjustments into NAV Swaps executed by reference to the current ETF Portfolio versus the current creation and redemption Basket Portfolios or Modified Basket Portfolios and/or the current Variance Portfolios;

a module configured to calculate the real-time current NAVs ("Intraday NAVs") of the ETF Portfolio and the applicable creation and redemption Basket Portfolios, Beta Patch Portfolios, Modified Basket Portfolios and/or Variance Portfolios throughout periods of an ETF's market trading;

an ETF Swap module configured to establish the terms of and provide for the periodic entry into and exit from NAV Swaps by the ETF Party with market makers in the ETF's shares and other eligible arbitrageurs, through which the ETF Party and the swap counterparties will make and receive payments based on the performance of: (a) the ETF Portfolio versus a prescribed creation or redemption Basket Portfolio or Modified Basket Portfolio; or (b) a prescribed Variance Portfolio, in each case referencing notional values as determined by the counterparty that are intended to adjust up or down over the course of each trading day as the counterparty adjusts its long or short inventory positions in the ETF's shares and correspondingly adjusts its Basket Portfolio or Modified Basket Portfolio holdings or a proxy for them;

an ETF Party module communicably coupled to the ETF Fund module and the ETF Swap module, in which the ETF Party module is configured for being operated by the ETF, an affiliate of the ETF (such as its investment advisor, administrator, custodian or a broker-dealer subsidiary of any of the foregoing) or other third party designated by the fund as ETF Party;

one or more processors configured to implement the ETF Fund modules;

optionally, the ETF Fund module configured to use intraday NAV Swaps and other elements of the present invention in combination with (a) intraday creations and redemptions of Creation Units of ETF shares and/or (b) a multi-class fund structure incorporating at least one class of special dealer shares that may be created and redeemed in single share or otherwise very small Creation Unit sizes, such as described in U.S. patent application Ser. No. 13/889,587 filed on May 8, 2013 which is fully incorporated herein by reference for all purposes; and optionally, the ETF Fund module configured for combining the ETF Fund's investment program, using a master-feeder configuration, with that of one or more other funds that follow the same portfolio disclosure policies as the ETF Fund.

Particular aspects of the invention will now be described in greater detail with reference to the figures. Referring to FIG. 1A, one aspect of the present invention is embodied in a system 100 consisting of Master Portfolio 14 with two feeder feeds: Mutual Fund 12 and ETF 16. (Portfolio 14 may be an open-end investment company registered under the Investment Company Act offering share interests on a private basis to affiliated funds and certain other accredited investors.) Mutual Fund 12 is a conventional open-end mutual fund, configured to issue and redeem share interests each business day at the next-determined market-closing NAV, primarily in cash. ETF 16 differs from conventional ETFs by utilizing NAV Swaps and other aspects of the present invention to facilitate efficient arbitrage between market trading prices and the underlying value of its shares while maintaining the confidentiality of current portfolio trading information.

Those skilled in the art will recognize that Master portfolios operating as open-end investment companies registered under the Investment Company Act are permitted to meet redemptions of affiliated feeder funds in kind through the distribution of portfolio securities, provided that certain conditions described in a "no-action" letter issued by the SEC staff in December 1999 are met. (Response of the Office of Chief Counsel, SEC Division of Investment Management, to Signature Financial Group, Inc. dated Dec. 28, 1999. SEC Ref. No. 99-825). Such conditions include that: (a) the redemption in kind is effected at approximately the feeder fund's proportionate share of the master portfolio's current net assets; (b) the distributed securities are valued in the same manner as used in computing the master portfolio's net asset value; (c) the distribution is consistent with the master portfolio's publicly disclosed redemption policies and undertakings; (d) neither the redeeming feeder fund "nor any other party with the ability and the pecuniary incentive to influence the redemption in kind" selects, or influences the selection of, the distributed securities; (e) the redemption is effected pursuant to procedures adopted by the master portfolio's board of directors, including a majority of the independent directors, and they approve the redemption upon a finding that the redemption does not favor the redeeming feeder fund to the detriment of any other shareholder or favor the master portfolio to the detriment of the redeeming feeder fund and is in the best interests of the master portfolio; and (f) specified records in connection with each redemption in kind are maintained for at least six years after the end of the fiscal year in which the redemption occurs.

Embodiments of the present invention are configured to satisfy these conditions using a master portfolio having feeder funds that include one or more ETFs. An ETF feeder fund is configured to use in-kind purchases and/or redemptions of master portfolio securities in a manner substantially similar to that conventionally used to issue and redeem ETF shares. The securities a feeder ETF receives upon the in-kind purchase of its shares by or through an Authorized Participant would generally be invested in the associated master portfolio to increase the feeder ETF's investment therein. The securities a feeder ETF distributes in connection with an in-kind redemption of its shares by or through an Authorized Participant would normally be sourced from the associated master portfolio. To avoid favoring one set of feeder fund investors over another, a master portfolio that utilizes in-kind purchases and redemptions for feeder ETFs may transact with its mutual fund feeders on the same basis, accepting incremental investments primarily in the form of securities, rather than cash, and meeting redemptions also primarily in securities. Since most mutual funds are designed to transact with their shareholders in cash, this would normally require a feeder mutual fund to use shareholder net cash inflows to buy (at the feeder fund level) securities that it then contributes to the master portfolio to increase its investment therein, and to sell (at the feeder fund level) the securities it receives in connection with in-kind redemptions of master portfolio interests to fund shareholder net cash outflows. As long as each feeder fund transacts with master portfolios on the same basis, mutual funds and ETFs offered by the same sponsor and pursuing substantially similar investment programs may take advantage of the operating efficiencies associated with pooling investments into a commonly managed entity. The benefits of using the master-feeder structure may be particularly advantageous for a newly formed ETF that seeks to replicate an established mutual fund of the same sponsor.

For simplicity of presentation, the remaining Figures show and describe ETF 16 as operating on a standalone basis (i.e., outside of any master-feeder arrangement) and serving as the ETF Party in NAV Swap transactions with Market Makers. It should be understood that, in particular embodiments, ETF 16 may be used in a master-feeder structure such as shown on FIG. 1A and/or may designate an affiliate of the ETF or other third party as the ETF Party to its NAV Swap transactions.

Figure 1B:
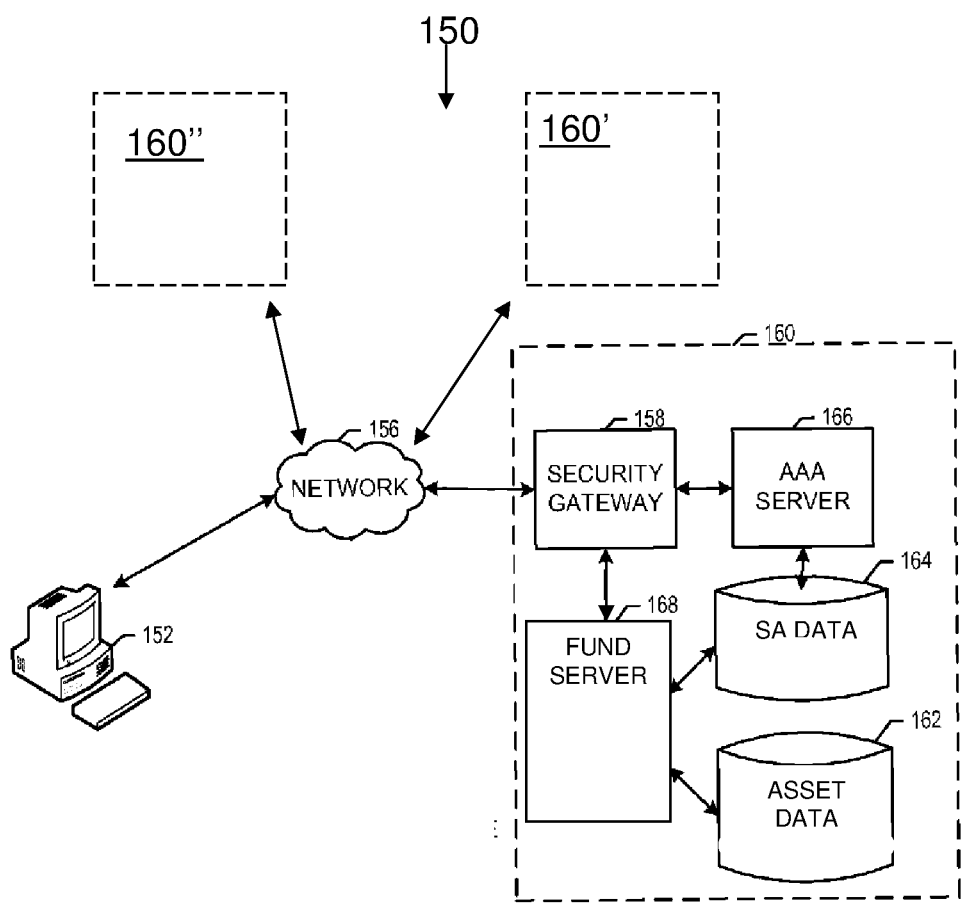
FIG. 1B is a diagrammatic representation of an embodiment of an automated fund system within which the embodiment of FIG. 1A may be incorporated.

With reference to FIG. 1B, an automated Fund system 150, including a system of networked, specially configured computers, may be used to implement various transactions and data transfers associated with operation of the embodiments described herein. The system 150 may include an AP (Authorized Participant) workstation 152 and a Fund system 160 for the Fund 16 (ETF). Fund system 160 may include Fund server 168, a database 162 containing information relating to the Fund portfolio securities and asset configurations, and database 164 containing data relating to the Fund 16 and optionally, any additional Funds 12 and 14, such as identification information, password files, encryption keys, other access authorization and accounting (AAA) data. In this regard, Fund system 160 may optionally include AAA server 166 and a security gateway 158. The various components communicate over network 156, which may be a public network such as the Internet, or a private network including leased lines, or a virtual private network using virtual private network (VPN) protocols. System 150 may also include additional Fund systems 160' and 160", e.g., to embody Master Portfolio module 14 and (Mutual) Fund module 12, respectively. Fund systems 160' and 160" may be substantially similar to Fund system 160.

In particular embodiments, the various transactions and transfers described herein may take place using the systems and components shown in FIG. 1B, although one of skill in the art will appreciate that many variations of the system may be implemented without departing from the scope of the invention. Suitable networking protocols may be used, including the Transport Control Protocol/Internet Protocol (TCP/IP) suite of protocols, and also including the Hyper-Text Transport Protocol (HTTP) and associated security protocols HTTPS, and other mechanisms such as Virtual Private Networking (VPN), Secure Sockets Layer (SSL), Transport Layer Security (TLS), tunneling protocols such as Generic Routing and Encapsulation (GRE), Layer 2 Tunneling Protocol (L2TP), and the like. Another protocol that may be used to facilitate the transactions and associated messaging described herein is the Financial Information eXchange (FIX) Protocol, which is a messaging standard developed specifically for the real-time electronic exchange of securities transactions. FIX is a public-domain specification owned and maintained by FIX Protocol, Ltd. In addition, some of the transactions may be communicated in a manual fashion, such as via telephone or textual messaging (email, and the like), whereupon the relevant transaction information may be entered into the appropriate computer systems.

Figure 1C:
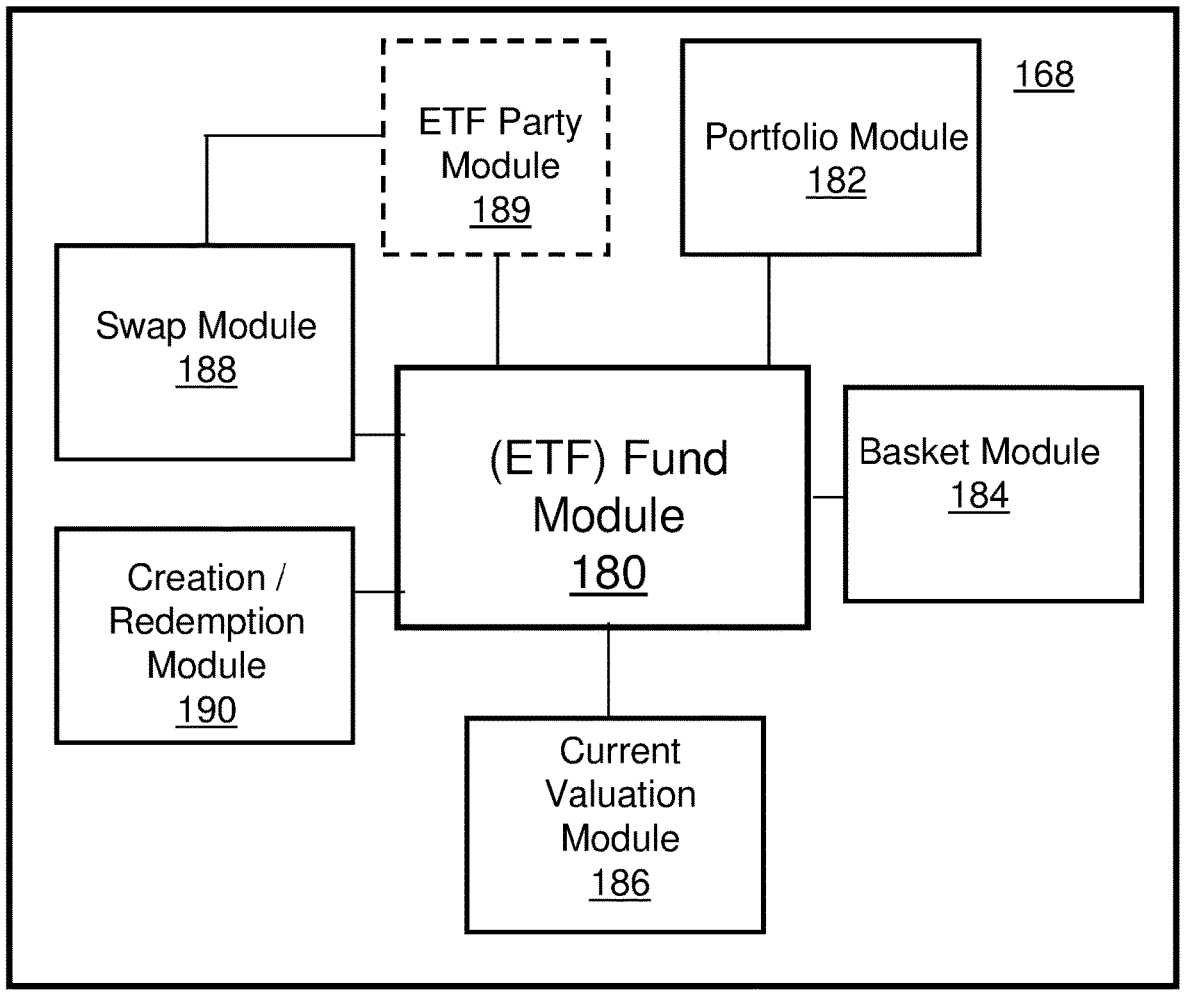
FIG. 1C is a block diagram of a portion of the embodiment of FIG. 1B.
Figure 3:
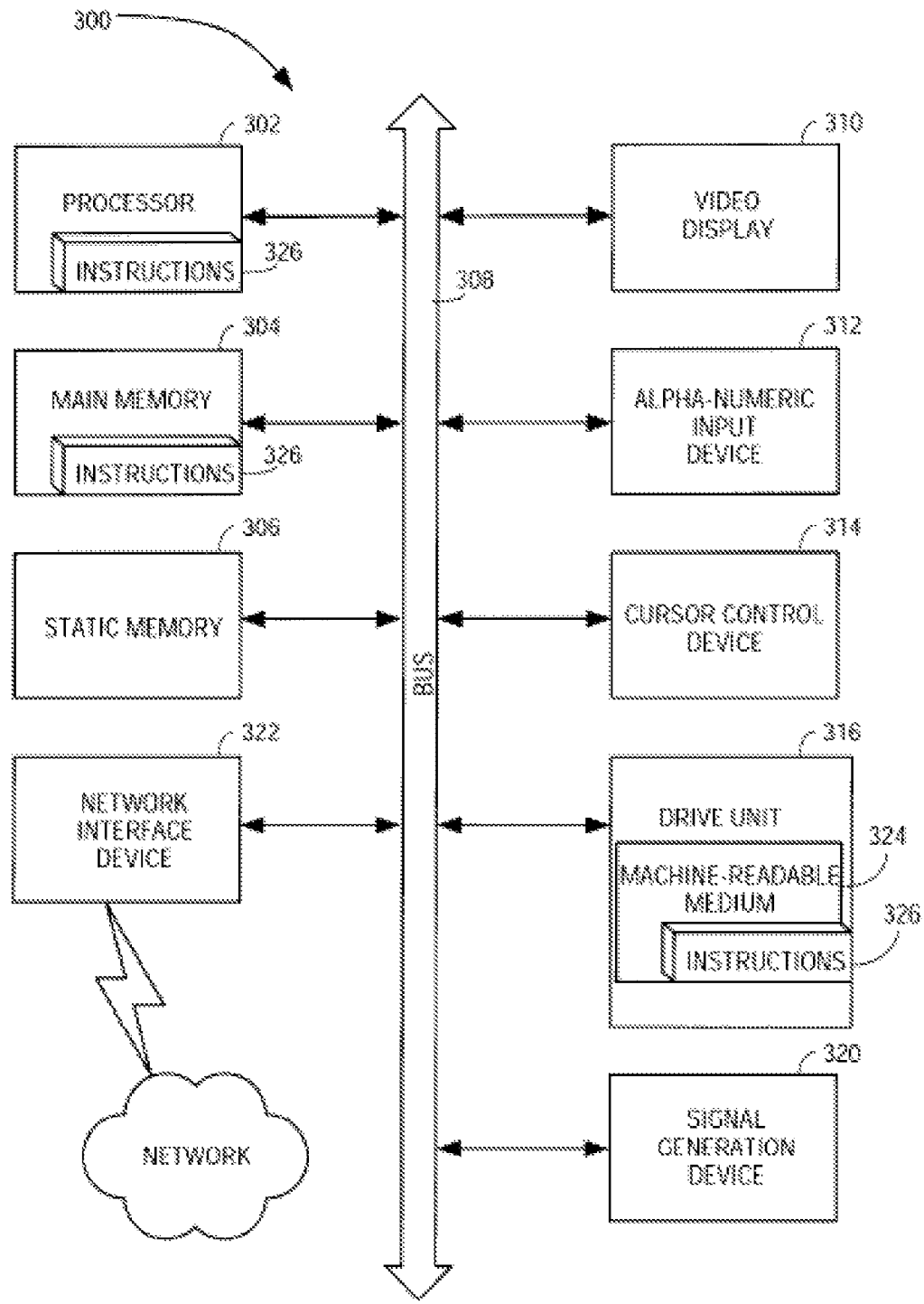
FIG. 3 is a block diagram of one embodiment of a computer system usable with any of the embodiments of present invention.

Turning now to FIG. 1C, a particular example of fund server 168 includes a series of modules, including Fund Module 180, Portfolio Module 182, Basket Module 184, Current Valuation Module 186, Swap Module 188, an optional ETF Party Module 189, and Creation/Redemption Module 190, all of which are communicably coupled to one another and implemented by one or more processors (FIG. 3). Fund Module 180 is configured to define an actively managed fund having a plurality of shares available for sale, the plurality of shares being tradable on one or more secondary markets. The Portfolio Module 182 is configured to track a fund portfolio of assets held by the fund while maintaining confidentiality of at least a portion of the fund portfolio. Basket Module 184 is configured to identify and publish a Fund Basket in the form of at least one of a Creation Basket and a Redemption Basket, the Fund Basket including a subset of the assets included in the fund portfolio. The Current Valuation Module 186 is configured to calculate a current intraday net asset value (Intraday NAV) of the assets held by the fund, the Intraday NAV being calculated periodically throughout a trading day at a predetermined "NAV frequency". The Current Valuation Module 186 is also configured to calculate and publish an indicative intraday value (IIV) of the assets held by the fund, the IIV being calculated and published throughout the trading day at a predetermined "IIV frequency" and at a predetermined "IIV precision". The Swap Module 188 is configured to establish terms of, and provide for the periodic entry into and exit from, NAV Swaps (and/or alternative instruments with similar effect, as described hereinbelow, all of which are collectively referred to herein as 'NAV Swaps') between an ETF Party associated with the ETF, and Swap Counterparties, wherein the ETF Party and Swap Counterparties exchange payments based on performance of the fund portfolio and the Fund Basket. The optional ETF Party Module enables parties affiliated with the ETF to engage the system. The Creation/Redemption Module 190 is configured to selectively permit creations and redemptions of fund shares by a qualified party, in exchange for the Fund Basket. These modules interoperate as discussed herein, to permit the qualified party to effect arbitrage between a current market price of the fund shares and the Intraday NAV in absence of full disclosure of said fund portfolio.

Having described exemplary embodiments of a system in accordance with the present invention, methods of using these embodiments, including operation of automated fund system 150, will now be described as illustrated by FIGS. 2A-3D.

FIGS. 2A-2D show representations of an arbitrage mechanism that may be employed, e.g., by a Market Maker 202 or other Authorized Participant using AP workstation 152 (FIG. 1B), using the output generated by embodiments of the present invention. As shown and described, the Market Maker 202 may receive and use the output generated by the Current Valuation Module 186 and the Basket Module 184 (FIG. 1C) to then sell (FIGS. 2A, 2B) or buy (FIGS. 2C, 2D) shares of ETF 16 in secondary market transactions.

Figure 2A:
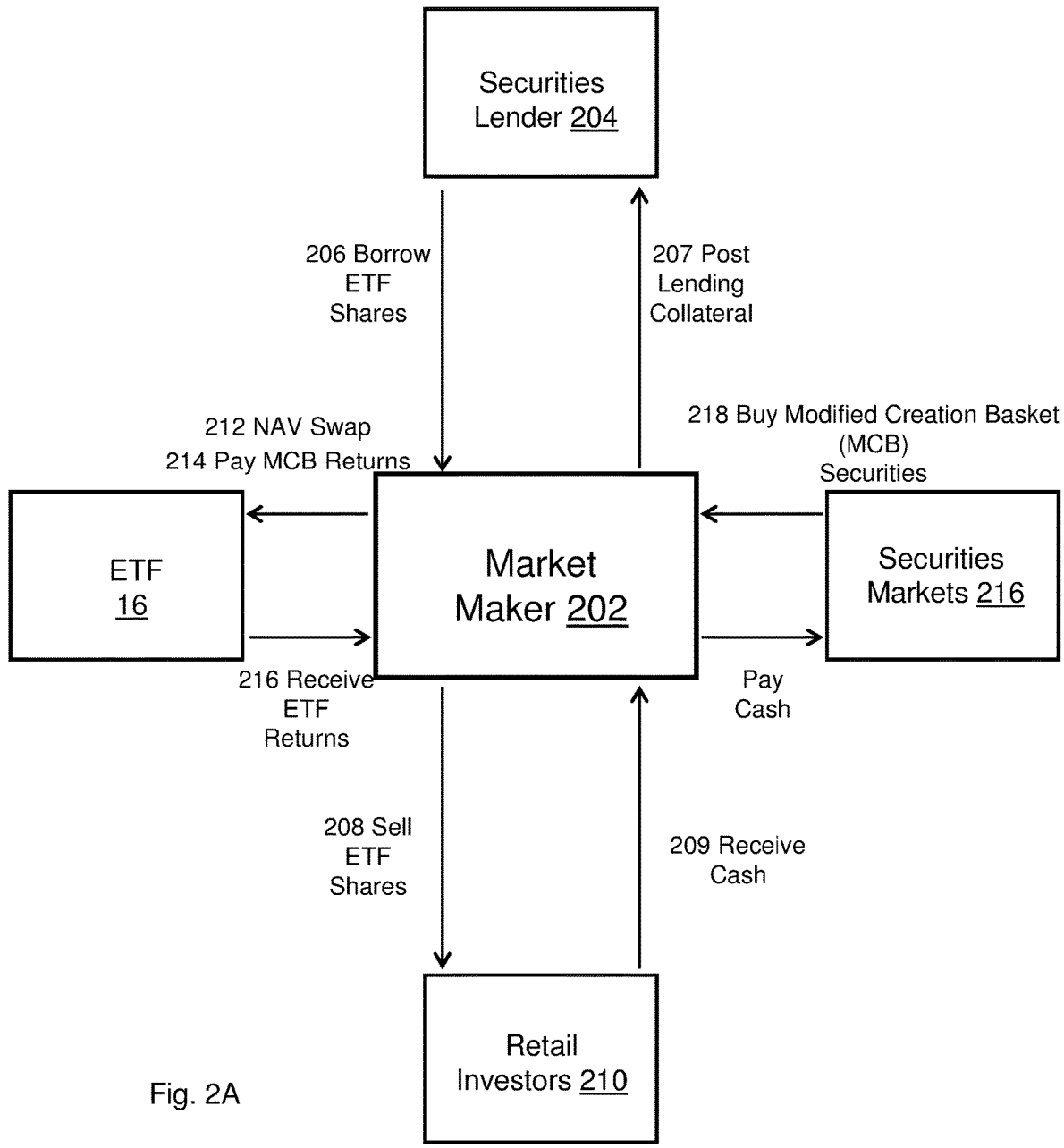
FIG. 2A is a functional block diagram of various transactional aspects of a system and method of the present invention.

FIG. 2A illustrates how the system 160 may be used in the event the current market price of the ETF shares exceeds the Intraday NAV as provided by Current Valuation Module 186. As shown, Market Maker 202 borrows shares of ETF 16 from a Securities Lender 204 at 206 (in exchange for posting collateral at 207) and sells them at 208 (for cash 209) in secondary market transactions on an exchange (e.g., with Retail Investors 210). (It should be recognized that the terms "Retail Investors" 210 and "Securities Markets" 216 are used interchangeably herein to with reference to conventional secondary market transactions.) At approximately the same time, Market Maker 202 purchases an equivalent quantity of the securities (e.g., using the cash received at 209) constituting ETF 16's current Modified Basket Portfolio (including any Beta Patch Portfolio) for creations (as determined by Basket Module 184, FIG. 1C) at 218, via Securities Markets 216. Market Maker 202 also enters into a NAV Swap (or alternative instruments with similar effect) with ETF 16 (or other ETF Party designated by the ETF 16, via Swap Module 188 and optionally, ETF Party Module 189) at 212 with a notional value corresponding to the value of the ETF 16 shares sold at 208, paying the return at 214, generated by the Modified Basket Portfolio for creations, as adjusted for any Alpha Patch Adjustment that applies, purchased at 218 and receiving the return generated by ETF 16's ETF Portfolio at 216. This process may be effectively repeated as desired. In this regard, each time the Market Maker 202 materially changes its ETF 16 share inventory position by buying or selling ETF 16 shares in the secondary market e.g., at 208, it correspondingly adjusts the size of its NAV Swap position with ETF 16 at 212 and its holdings of the Modified Basket Portfolio securities at 218. Near the end of each day, ETF 16 (via Basket Module 184) discloses the Modified Basket Portfolio for creations that will apply on the next business day. Market Maker uses this information to make corresponding adjustments to its Modified Basket Portfolio holdings at 218, transacting at or near the market close.

Figure 2B:
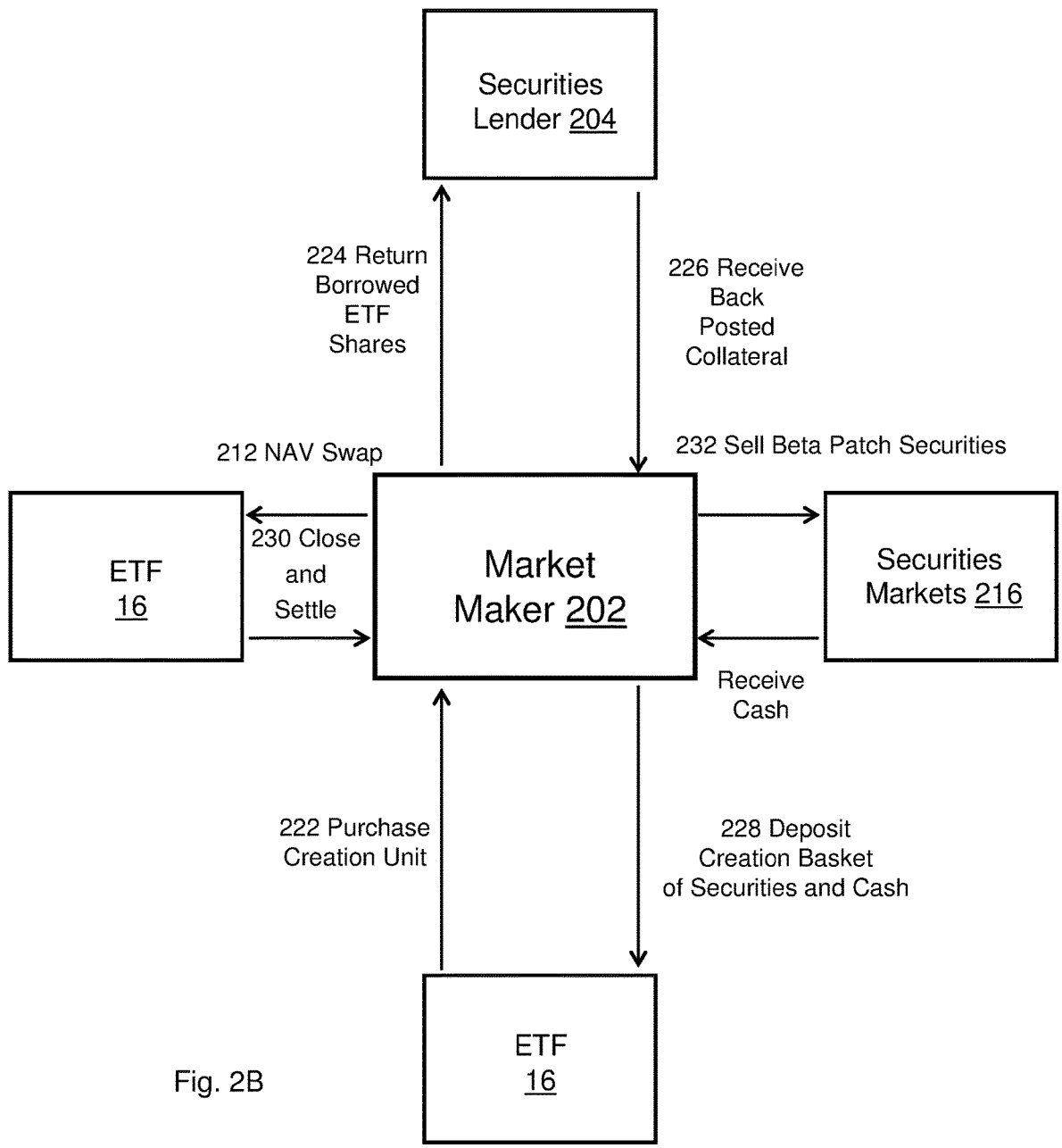
FIG. 2B is a functional block diagram of various transactional aspects of a system and method of the present invention.

As shown in FIG. 2B, when Market Maker's short position in ETF 16 grows to a Creation Unit of shares, Market Maker closes its position by transacting with ETF 16 (through an Authorized Participant via Creation/Redemption Module 190, FIG. 1C) to purchase a Creation Unit of shares at 222. Market Maker delivers the acquired ETF 16 shares at 224 to close its borrow position, receiving back its posted collateral at 226, and settles the ETF 16 share acquisition 222 by delivering the securities (e.g., purchased from Securities Markets 216) and cash that constitute the current ETF 16 creation Basket Portfolio and paying the creation fee that then applies at 228. Market Maker also terminates its NAV Swap at 230 and sells its Beta Patch Portfolio position included in the Modified Basket Portfolio at 232 on the secondary market 216.

Figure 2C:
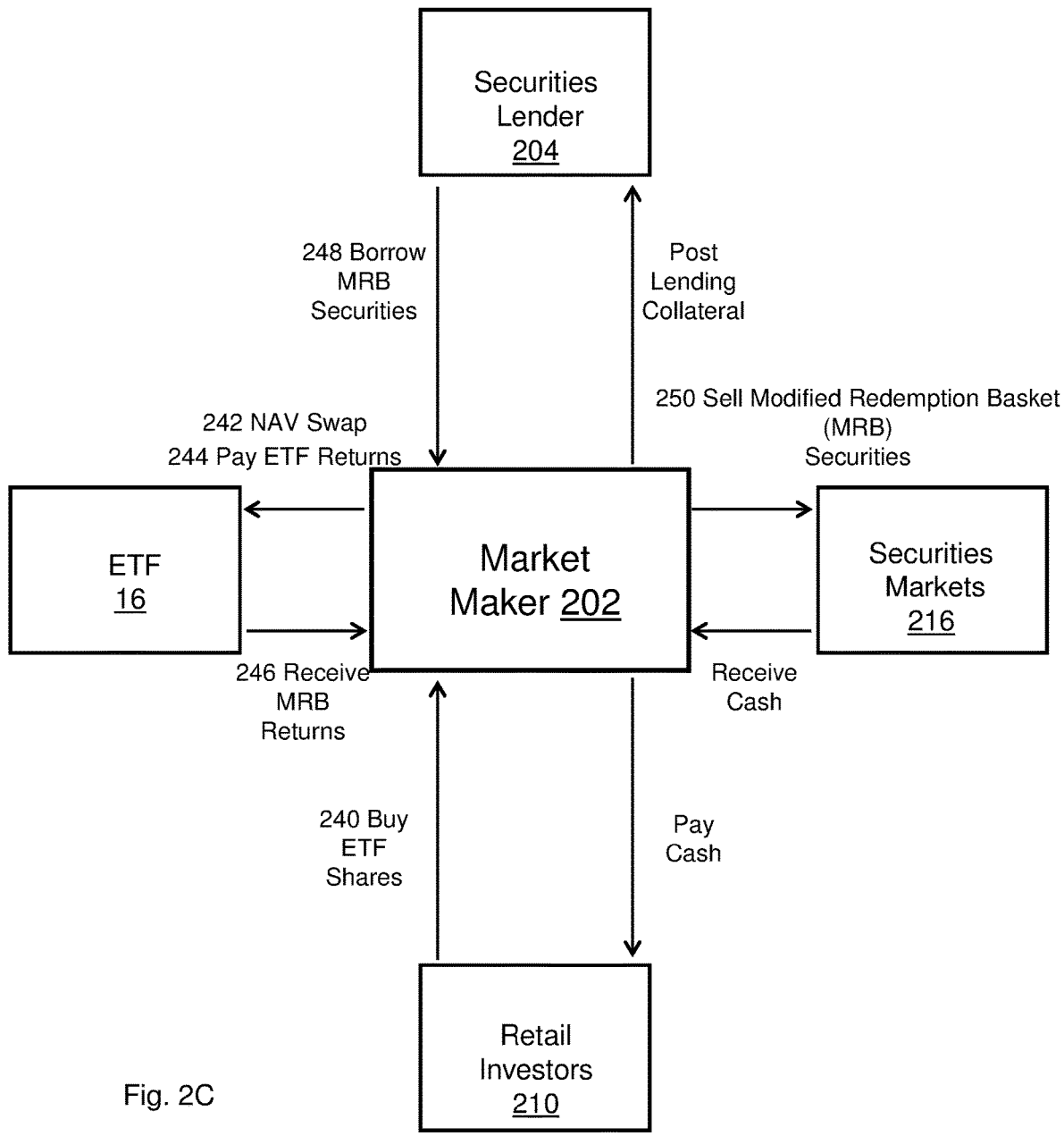
FIG. 2C is a functional block diagram of various transactional aspects of a system and method of the present invention.

FIG. 2C illustrates how the system 160 may be used in the event the Intraday NAV as provided by Current Valuation Module 186, exceeds the current market price of the ETF shares. As shown in FIG. 2C, Market Maker 202 buys shares of ETF 16 at 240 in secondary market transactions (e.g., with Retail Investors 210) on an exchange. At the same time, Market Maker 202 enters into a NAV Swap (or alternative instruments with similar effect) 242 with ETF 16 (or other ETF Party designated by the ETF 16, via Swap Module 188 and optionally, ETF Party Module 189) with a notional value equivalent to the value of the ETF 16 shares purchased at 240, paying 244 the return of ETF 16's ETF Portfolio and receiving 246 the returns of ETF 16's current Modified Basket Portfolio (i.e., of the same notional value as the shares purchased at 240, as determined by Basket Module 184, FIG. 1C) for redemptions (as adjusted for any Alpha Patch Adjustment that applies) at 246. Market Maker 202 then also borrows 248 and sells 250 an equivalent quantity of the securities constituting ETF 16's current Modified Basket Portfolio (including any Beta Patch Portfolio) for redemptions. Each time the Market Maker materially changes its ETF 16 share inventory position by buying or selling ETF 16 shares in the secondary market, it correspondingly adjusts the size of its NAV Swap position 242 with ETF 16 and its short position 250 in the Modified Basket Portfolio securities. Transacting at or near the market close, Market Maker adjusts its position in Modified Basket Portfolio securities at the end of each day corresponding to the day-to-day changes in ETF 16's disclosed Modified Basket Portfolio for redemptions.

Figure 2D:
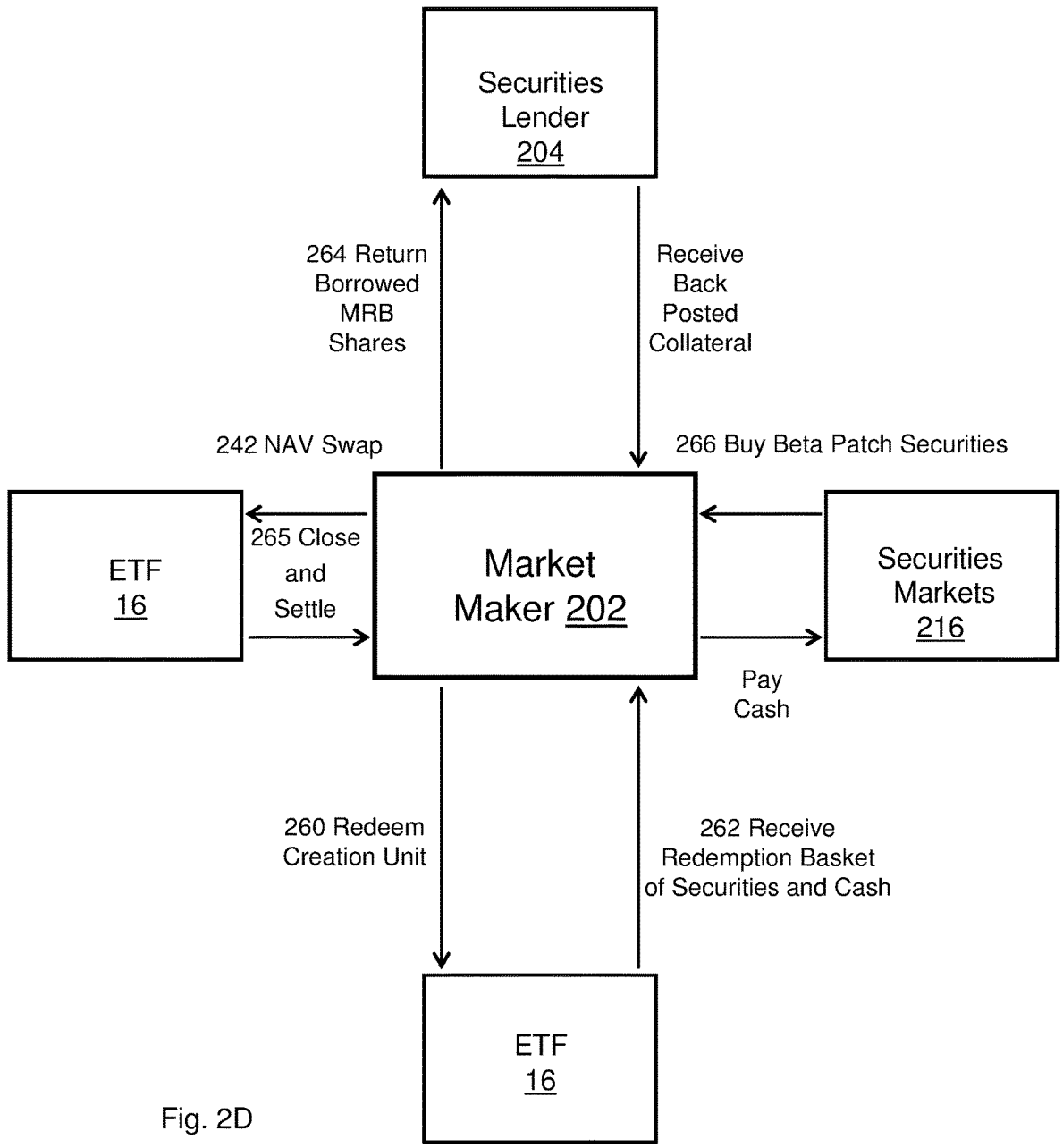
FIG. 2D is a functional block diagram of various transactional aspects of a system and method of the present invention.

As shown in FIG. 2D, when Market Maker's share ownership in ETF 16 grows to a Creation Unit of shares, Market Maker closes its position by transacting with ETF 16 (through an Authorized Participant) to redeem 260 a Creation Unit of shares in exchange for the Redemption Basket of Securities and Cash at 262 (as determined by Basket Module 184, FIG. 1C). Market Maker 202 pays the redemption fee that then applies, and delivers the Basket Portfolio securities it receives in settlement of the redemption at 262 to close its borrow position in such securities at 264. At the same time, Market Maker terminates 265 its NAV Swap 242 and buys the Beta Patch Portfolio holdings included in the Modified Basket Portfolio at 266 to close its short position therein.

It should be noted that in particular embodiments, the ETF 16 may itself engage in the NAV Swaps as shown in the examples of FIGS. 2A-2D. Alternatively, the NAV Swaps may be transacted with any of various other ETF Parties that may be designated by ETF 16, e.g., using ETF Party Module 189 which is communicably coupled to the ETF Fund module 202 and the ETF Swap module 188, as shown in phantom in FIG. 1C. ETF Party Module 189 is configured for being operated by the ETF 16, an affiliate of the ETF, such as its investment advisor, administrator, custodian or a broker-dealer subsidiary of any of the foregoing, or other third party designated by the fund as ETF Party.

By applying embodiments of the present invention as shown on FIGS. 2A-2D, Market Maker or other Authorized Participant earns arbitrage profits from secondary market trading in shares of ETF 16 to the extent that it either: (a) sells ETF 16 shares at an aggregate premium to their then-current values and/or purchases creation Basket Portfolio securities at an aggregate discount to their current market values that, in total, exceed the creation fee that applies plus the cost to the Market Maker of establishing and maintaining its hedge position using NAV Swaps and market transactions in Modified (creation) Basket Portfolio securities or (b) buys ETF 16 shares at an aggregate discount to their then-current values and/or sells redemption Basket Portfolio securities at an aggregate premium to their current market values that, in total, exceed the redemption fee that applies plus the cost to the Market Maker of establishing and maintaining its hedge position using NAV Swaps and market transactions in Modified (redemption) Basket Portfolio securities. Market Maker's ability to earn arbitrage profits from market making activity in ETF 16 is not meaningfully different from ETFs that are fully transparent. Accordingly, ETF 16 should trade with comparable bid-offer spreads and similar premiums and discounts to underlying portfolio value, even as it maintains the confidentiality of current portfolio trading information.

These embodiments thus provide a relatively simple and reliable opportunity for the Market Maker 202 to profit from the spread between the Intraday NAV and the current market price. These embodiments are therefore expected to advantageously tighten the spread, i.e., to narrow the premium or discount of market trading prices to underlying portfolio value, to support efficient secondary market trading for actively managed ETFs while maintaining the confidentiality of the ETF's current portfolio trading information.

Having shown and described various embodiments of the present invention, optional variations thereof will now be discussed, which cover adjacent methods, purposes, and fields of use:

1. Index-Based Exchange-Traded Funds.

By their terms, the foregoing embodiments apply to actively managed ETFs. Like actively managed ETFs, index-based ETFs may seek to not disclose their full portfolio holdings on a current daily basis to avoid other market participants learning to anticipate and profit from the ETF's trading activity (known as "front-running") or for other purposes. Thus, embodiments of the present invention apply to substantially all types of ETFs, whether actively managed or index-based.

2. Instruments Similar in Effect to Intraday Net Asset Value Swaps.

As described hereinabove, the foregoing embodiments cover intraday NAV Swaps entered into between an ETF Party (the ETF, its investment adviser, custodian or other affiliate, or other designated third party) and one or more Swap Counterparties that are Market Makers in the ETF's shares. Under a NAV Swap, the ETF Party and Swap Counterparty exchange payments based on the relative returns of the ETF's holdings as of the end of the previous Business Day (ETF Portfolio) and a publicly disclosed Basket Portfolio, Modified Basket Portfolio or other Reference Portfolio (Disclosed Reference Portfolio). It should be recognized that while it may describe a particular investment instrument, as used herein, the term 'NAV Swap' also includes any number of alternative instruments capable of providing a similar effect, including, without limitation: financial futures; options on financial futures; forward foreign currency exchange contracts and currency futures; put options; call options; interest rate swaps, caps, floors and/or collars; transactions in physical securities; and combinations thereof. Thus, as used herein, the term 'NAV Swap' encompasses substantially any financial instrument that may be used to effect exchanges of value between an ETF Party and an Arbitrageur Counterparty based on the relative returns of the ETF Portfolio and the Disclosed Reference Portfolio. As used herein, the term 'Swap Counterparty' and/or 'Swap Counterparties' refers to the Arbitrageur Counterparty in any of the aforementioned NAV Swaps. These embodiments thus include substantially all methods for an ETF Party and an Arbitrageur Counterparty to effect exchanges of value between themselves based on the relative returns of the ETF Portfolio and Disclosed Reference Portfolio, whether using NAV Swaps, other derivative instruments, transactions in physical securities or any combination thereof.

3. Multiple Methods of Determining Intraday Net Asset Values of ETF Portfolios and/or Disclosed Reference Portfolios.

As described hereinabove, the foregoing embodiments apply to NAV Swaps in which valuations of constituent investments of an ETF Portfolio and Disclosed Reference Portfolio may be based on most recent market trading prices, current bid-offer midpoints or other measures of current net asset value (NAV). In certain applications, it may be advantageous for a subject ETF to make available to Swap Counterparties more than one NAV Swap facility, which differ based on the method of determining intraday values of the ETF Portfolio and/or the Disclosed Reference Portfolio. In addition to most recent market trading prices and current bid-offer midpoints, valuations for NAV Swap purposes may, for example, be based on bid-side or offer-side prices of constituent investments or determinations of fair value that reflect market movements since a constituent investment most recently traded. These alternative approaches thus encompass the use of one or more NAV Swap facilities (or alternative instruments with similar effect) that apply various methods to determine intraday values of ETF Portfolios and/or Disclosed Reference Portfolios.

4. Use of NAV Swaps (and Alternative Instruments with Similar Effect) to Facilitate Efficient Secondary Market Trading of ETF Shares, Whether or not in the Absence of Full Portfolio Holdings Disclosure.

As described hereinabove, the foregoing embodiments describe the application of NAV Swaps to ETFs that do not disclose their full portfolio holdings on a current daily basis to avoid other market participants front-running the ETF's trades and/or for other purposes. In addition to facilitating efficient secondary market trading of ETFs that do not disclose their full holdings each Business Day, NAV Swaps (and alternative instruments with similar effect) may also be used to facilitate better secondary market trading of ETFs that provide full daily holdings disclosure. ETFs whose portfolio investments include securities and other instruments that trade outside U.S. market hours (Foreign Investments) customarily trade with wider bid-ask spreads and more variable premiums/discounts to NAV than ETFs that hold only investments that trade during U.S. market hours (U.S. Investments), reflecting the greater challenges to efficient arbitrage imposed by an ETF holding Foreign Investments. Whereas Market Makers in shares of ETFs holding only U.S. Investments can readily lay off their intraday ETF share inventory risk by simultaneously selling or buying offsetting amounts of the ETF's constituent investments as they buy or sell ETF shares over the course of the trading day, that option is not customarily available for ETFs that hold Foreign Investments. To help support efficient secondary market trading in its shares, an ETF holding Foreign Investments may establish NAV Swap facilities with Market Makers and other arbitrageurs, whereby the ETF Party and Arbitrageur Counterparty would exchange payments based on the relative returns of the ETF Portfolio and a Disclosed Reference Portfolio that consists of securities correlated to the ETF's holdings that trade during U.S. market hours. By (i) buying and selling the securities that constitute the Disclosed Reference Portfolio and (ii) adjusting its NAV Swap positions with the ETF Party, a Market Maker in shares of an ETF holding Foreign Investments could manage its intraday ETF share inventory risk with substantially the same level of precision as for ETFs holding U.S. Investments, positioning the ETF to trade with narrower bid-ask spreads and less variable premiums/discounts to NAV than other ETFs that hold similar Foreign Investments. For ETFs holding certain types of less-liquid U.S. Investments, use of NAV Swaps may also promote more efficient secondary market trading. These alternative approaches thus encompass use of NAV Swaps and alternative instruments with similar effect to facilitate efficient secondary market trading in ETF shares, irrespective of whether the subject ETF discloses its full holdings on a current daily basis.

5. Flexibility in Determination of Disclosed Reference Portfolio Used in NAV Swaps.

As described hereinabove, the foregoing embodiments apply to NAV Swaps in which the Disclosed Reference Portfolio may be an ETF's current creation Basket Portfolio, current redemption Basket Portfolio or a Modified Basket Portfolio that varies from the ETF's current creation or redemption Basket Portfolio to include positions in index ETFs, index futures contracts or other executable market instruments representative of the incremental aggregate market exposure of the ETF's current or desired portfolio composition versus the creation or redemption Basket Portfolios. (The foregoing embodiments describe variations between an ETF's Modified Basket Portfolio and the relevant Basket Portfolio as "Beta Patch Adjustments.") In certain applications, it may be advantageous for a subject ETF to employ in NAV Swaps a Disclosed Reference Portfolio that has little or no overlap with the ETF's current creation or redemption Basket Portfolios. Additionally, in certain applications, a subject ETF may benefit from simultaneously utilizing multiple NAV Swap facilities, each based on a different Disclosed Reference Portfolio, or by changing the composition of the Disclosed Reference Portfolio for an NAV Swap more than once each Business Day. These alternative embodiments thus encompass the use in NAV Swaps of Disclosed Reference Portfolios that include executable market instruments of various descriptions as determined by the subject ETF and disclosed prospectively to the Swap Counterparties. These alternate embodiments may also include a subject ETF's simultaneous utilization of multiple NAV Swap facilities, each based on a different Disclosed Reference Portfolio, and use of NAV Swaps for which the Disclosed Reference Portfolio changes intraday.

6. Flexibility in Determination of Supplemental Payments in Connection with NAV Swaps.

As described hereinabove, under the foregoing embodiments, the terms of NAV Swaps may provide for the returns of the ETF Portfolio or Disclosed Reference Portfolio for purposes of intraday valuations and payments at settlement to be adjusted upward or downward by a predetermined amount to reflect, for example, the ETF Party's projection of the (unadjusted) relative performance of the two portfolios. (These are described as "Alpha Patch Adjustments.") An Alpha Patch Adjustment that anticipates outperformance of the ETF Portfolio over the Disclosed Reference Portfolio would increase a Market Maker's cost to hedge short positions in ETF shares, and decrease its cost to hedge long positions in ETF shares. In certain applications, it may be advantageous for NAV Swaps to incorporate supplemental payments different than the Alpha Patch Adjustments described hereinabove. These alternative embodiments thus encompass the use in NAV Swaps of built-in supplemental payments of various descriptions, which may or may not relate to the subject ETF's expectation of relative performance of the ETF Portfolio versus the Disclosed Reference Portfolio. Such payments may include, for example, amounts varying based on the number of discrete NAV Swap transactions entered into or the notional value of outstanding NAV Swap positions. Moreover, these alternative embodiments provide for NAV Swap supplemental payments that apply substantially equally to ETF Parties and Swap Counterparties, or only to a single counterparty.

7. NAV Swaps Addressing Basis Risk Between Creation/ Redemption Basket Portfolios and Disclosed Reference Portfolios.

ETFs holding Foreign Investments commonly include in their creation and/or redemption Basket Portfolios securities and other instruments that are not available for purchase or sale in public markets at times corresponding to when the subject ETF's daily NAVs and the valuation of Basket Portfolio instruments for creation and redemption purposes are determined, generally 4:00 PM Eastern time. Market Makers and other arbitrageur's in an ETF including Foreign Instruments in its creation and redemption Basket Portfolios frequently enter into transactions in derivative instruments and/or physical securities to seek to hedge their risk exposure to creation/redemption Basket Portfolio instruments in which they hold positions during the time interlude between when such instruments are valued for creation and redemption purposes (generally 4:00 PM Eastern time) and when they are available for purchase or sale in public markets. The basis risk assumed by Market Makers and other arbitrageurs with respect to Foreign Instruments included in creation/redemption Basket Portfolios during this time interval (Creation/Redemption Basket Overnight Basis Risk) is often a major contributor to their overall risk of arbitraging the subject ETF's shares. These alternative embodiments encompass NAV Swaps designed to address Creation/Redemption Basket Overnight Basis Risk, whereby an ETF Party and Arbitrageur Counterparty agree to exchange payments based on (i) the relative returns of a specified creation or redemption Basket Portfolio (or a subset thereof) and a Designated Reference Portfolio that is representative of hedging instruments with respect to such Basket Portfolio (or subset thereof) available to arbitrageurs over time periods outside U.S. market trading hours and/or (ii) the relative returns of the current ETF Portfolio and a Designated Reference Portfolio that is representative of hedging instruments with respect to the current ETF Portfolio (or subset thereof) available to arbitrageurs over time periods outside U.S. market hours. An ETF Party and Arbitrageur Party may use NAV Swaps to address Creation/Redemption Basket Overnight Basis Risk arising in connection with one or more of the following transactions: (i) the earlier (than the time of the associated ETF share creation) purchase of creation Basket Portfolio instruments to be contributed to an ETF to effect a creation (purchase) of the ETF's shares; (ii) the earlier (than the time of the associated ETF share redemption) sale of redemption Basket Portfolio instruments to be received from an ETF in a redemption of the ETF's shares; (iii) the later (than the time of the associated ETF share creation) purchase of creation Basket Portfolio instruments contributed to an ETF to effect a completed creation (purchase) of the ETF's shares; and (iv) the later (than the time of the associated ETF share redemption) sale of redemption Basket Portfolio instruments received from an ETF in a completed redemption of the ETF's shares.

FIG. 3 shows a diagrammatic representation of a machine in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, and optical and magnetic disks.

Thus, a method and apparatus for effecting arbitrage between market price and underlying value of ETF shares in the absence of full portfolio disclosure using intraday NAV Swaps have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

Furthermore, embodiments of the present invention include a computer program code-based product, which includes a computer readable storage medium having program code stored therein which can be used to instruct a computer to perform any of the functions, methods and/or modules associated with the present invention. The non-transitory computer readable medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static, dynamic, or volatile memory or data storage devices, but does not include a transitory signal per se.

It should be noted that the various modules and other components of the embodiments discussed hereinabove may be configured as hardware, as computer readable code stored in any suitable non-transitory computer usable medium, such as ROM, RAM, flash memory, phase-change memory, magnetic disks, etc., and/or as combinations thereof, without departing from the scope of the present invention.

It should be further understood that any of the features described with respect to one of the embodiments described herein may be similarly applied to any of the other embodiments described herein without departing from the scope of the present invention.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

The above systems are implemented in various computing environments. For example, the present invention may be implemented on a conventional IBM PC or equivalent, multi-nodal system (e.g., LAN) or networking system (e.g.,

Internet, WWW, wireless web). All programming and data related thereto are stored in computer memory, static or dynamic or non-volatile, and may be retrieved by the user in any of: conventional computer storage, display (e.g., CRT, flat panel LCD, plasma, etc.) and/or hardcopy (i.e., printed) formats. The programming of the present invention may be implemented by one skilled in the art of computer systems and/or software design.

What is claimed is:

1. A method for enabling arbitrage between market price and underlying value of Exchange-Traded Fund (ETF) shares in the absence of full portfolio disclosure, to support efficient secondary market trading, the method comprising:
   (a) defining, with a Fund Module, an exchange-traded fund (ETF) having a plurality of ETF shares available for sale, the plurality of ETF shares being tradable on one or more secondary markets;
   (b) tracking, with a Portfolio Module, a fund portfolio of assets held by the fund while maintaining confidentiality of at least a portion of the fund portfolio;
   (c) identifying and publishing, with a Basket Module, a Fund Basket in the form of at least one of a Creation Basket, a Redemption Basket, and a Modified Basket that varies from the Creation Basket and/or Redemption Basket, the Fund Basket including a subset of the assets held by the fund and/or another set of assets that trade during U.S. trading hours and are correlated to the assets held by the fund;
   (d) calculating, with a Current Valuation Module, a current intraday net asset value (Intraday NAV) of the assets held by the fund, the Intraday NAV being calculated periodically throughout a trading day at an NAV frequency;
   (e) establishing, with a Swap Module, terms of, and providing for the periodic entry into and exit from, NAV Swaps between an ETF Party associated with the ETF, and Swap Counterparties, wherein the ETF Party and Swap Counterparties exchange payments based on performance of the fund portfolio and the Fund Basket;
   (f) selectively permitting, with a Creation/Redemption Module, creations and redemptions of the ETF shares by a qualified party, in exchange for the Fund Basket;
   wherein the modules are processed by one or more computer processors; and
   wherein the qualified party is permitted to effect arbitrage between a current market price of said ETF shares and the Intraday NAV in absence of full disclosure of said fund portfolio and/or in which said fund portfolio includes non-U.S. assets, to support efficient secondary market trading.

2. The method of claim 1, wherein the ETF is actively managed or index-based.

3. The method of claim 2, wherein the NAV Swaps include one or more of: NAV Swaps; financial futures; options on financial futures; forward foreign currency exchange contracts and currency futures; put options; call options; interest rate swaps, caps, floors and/or collars; transactions in physical securities; and combinations thereof.

4. The method of claim 2, wherein said calculating (d) further comprises calculating, with the Current Valuation Module, the current intraday net asset value (Intraday NAV) of the assets held by the ETF and of the Fund Basket, using one or more of: most recent market trading prices; current bid-offer midpoints; bid-side or offer-side prices of constituent investments; determinations of fair value based on market movements since a constituent investment most recently traded; and combinations thereof.

5. The method of claim 2, wherein said identifying and publishing (c) further comprises identifying and publishing a Modified Basket that varies from the Creation and/or Redemption Basket to include positions in one or more of: index ETFs; index futures contracts; and/or other executable market instruments representative of a difference in market exposures of the ETF relative to the Creation and/or Redemption Basket.

6. The method of claim 5, further comprising identifying and publishing a plurality of mutually distinct Modified Baskets.

7. The method of claim 6, further comprising varying the composition of the Creation Basket, Redemption Basket, and/or Modified Basket periodically throughout the trading day.

8. The method of claim 7, wherein said establishing (e) further comprises mutually distinct sets of said NAV Swaps for mutually distinct Fund Baskets.

9. The method of claim 2, wherein the Swap Module configures the NAV Swaps to provide for said exchange of value to address overnight basis risk in connection with assets held by the ETF that trade outside of U.S. trading hours.

10. The method of claim 9, wherein the Swap Module configures the NAV Swaps to provide for said exchange of value to address Market Makers' overnight basis risk in connection with one or more of the following transactions: (i) the earlier (than time of the ETF share creation) purchase of Creation Basket assets to be contributed to an ETF to effect a creation of the ETF shares; (ii) the earlier (than time of the ETF share redemption) sale of Redemption Basket assets to be received from an ETF in a redemption of the ETF shares; (iii) the later (than time of the ETF share creation) purchase of Creation Basket assets contributed to an ETF to effect a completed creation of the ETF shares; and (iv) the later (than time of the ETF share redemption) sale of Redemption Basket assets received from an ETF in a completed redemption of the ETF shares.

11. The method of claim 2, further comprising enabling the ETF Party to access the Fund Module and the Swap Module using an ETF Party Module, the ETF Party module configured for being operated by one or more of the ETF, and an affiliate of the ETF.

12. The method of claim 11, further comprising identifying and publishing, with the Basket Module, a Beta Patch Portfolio representing a difference in market exposure between the fund portfolio and the Fund Basket.

13. The method of claim 12, further comprising identifying and publishing, with the Basket Module, a Fund Basket in the form of a Modified Basket Portfolio that combines the at least one Creation Basket and Redemption Basket, with one or more associated Beta Patch Portfolios.

14. The method of claim 13, further comprising identifying and publishing, with the Basket Module, a Variance Portfolio that represents a difference between the fund portfolio and either the Creation Basket Portfolio, the Redemption Basket Portfolio, or the Modified Basket Portfolio.

15. The method of claim 14, further comprising establishing, with the Swap Module, terms for the NAV Swaps in which the ETF Party and the Swap Counterparties make and receive payments based on performance of the fund portfolio relative to one or more of the Basket Portfolio, the Modified Basket Portfolio, and the Variance Portfolio.

16. The method of claim 15, further comprising establishing, with the Swap Module, terms for the NAV Swaps in which the ETF Party and the Swap Counterparties make and receive supplemental payments based on numbers of discrete NAV Swap transactions entered into and/or the notional value of outstanding NAV Swap positions.

17. The method of claim 16, further comprising applying, with the Swap Module, the supplemental payments substantially equally to ETF Parties and Swap Counterparties, or only to a single counterparty.

18. The method of claim 15, further comprising determining and integrating, with the Swap Module, one or more Alpha Patch Adjustments into the NAV Swaps, the Alpha Patch Adjustments including an adjustment to compensate for any expected difference in performance of the fund portfolio relative to the Basket Portfolio, the Modified Basket Portfolio, or the Variance Portfolio.

19. The method of claim 15, further comprising calculating, with the Current Valuation Module, the Intraday NAVs of one or more of the Beta Patch Portfolio, Modified Basket Portfolio, and Variance Portfolio.

20. The method of claim 1, further comprising calculating and publishing, with the Current Valuation Module, an indicative intraday value (IIV) of the assets held by the fund, the IIV being calculated and published throughout the trading day at an IIV frequency and an IIV precision.

21. The method of claim 1, maintaining, with the Current Valuation Module, the Intraday NAV in confidence.

22. The method of claim 1, wherein the subset of assets includes up to about 95 percent of the assets of said portfolio of assets.

23. The method of claim 22, wherein the subset of assets includes up to about 80 percent of the assets of said portfolio of assets.

24. The method of claim 1, wherein the Fund Basket comprises the subset of assets plus cash.

25. The method of claim 1, comprising identifying and publishing, with the Basket Module, the Fund Basket once each trading day.

26. The method of claim 1, comprising calculating, with the Current Valuation Module, the intraday NAV with greater precision than the IIV precision.

27. The method of claim 1, further comprising determining and disclosing, with a Fee Module, daily creation and redemption fees that increase or decrease with changes in estimated costs to the fund of trading to conform the Fund Basket to the fund portfolio.

28. The method of claim 1, wherein the Fund Module defines an actively managed feeder fund in a master-feeder configuration, with the Creation/Redemption Module enabling the creations and redemptions at a feeder level, and wherein the feeder fund feeds into a master portfolio which includes the fund portfolio.

29. The method of claim 28, further comprising defining, with another Fund Module, another feeder fund that feeds into the master portfolio.

30. The method of claim 1, comprising selectively permitting, with the Creation/Redemption Module, the intraday creations and redemptions by a qualified party that has entered into a confidentiality agreement with the fund, wherein the intraday creations and redemptions are effected electronically via a user computer communicably coupled to the Creation/Redemption Module.

31. The method of claim 1, establishing and maintaining, with the Fund Module, two or more share classes, including a first class of shares being holdable only by the qualified party under agreement with the fund, and a second class being holdable without restriction.

32. The method of claim 31, wherein the first class of shares may be exchanged for the second class of shares with an Authorized Party.

\* \* \* \* \*

UNITED STATES PATENT AND TRADEMARK OFFICE
CERTIFICATE OF CORRECTION

| | |
|---|---|
| PATENT NO. | : 11,593,879 B1 |
| APPLICATION NO. | : 17/335436 |
| DATED | : February 28, 2023 |
| INVENTOR(S) | : Thomas E. Faust, Jr. |

It is certified that error appears in the above-identified patent and that said Letters Patent is hereby corrected as shown below:

On the Title Page

Item (73), Assignee change "Eaton Vance Management, Boston, MA (US)" to --MORGAN STANLEY SERVICES GROUP INC., Boston, MA (US)--

Signed and Sealed this
Eighteenth Day of July, 2023

Katherine Kelly Vidal
*Director of the United States Patent and Trademark Office*